US012791481B2

(12) United States Patent
Christ

(10) Patent No.: US 12,791,481 B2
(45) Date of Patent: Nov. 10, 2026

(54) IMAGING DEVICE

(71) Applicant: LEICA MICROSYSTEMS CMS GMBH, Wetzlar (DE)

(72) Inventor: Stefan Christ, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 671 days.

(21) Appl. No.: 18/349,224

(22) Filed: Jul. 10, 2023

(65) Prior Publication Data

US 2024/0060892 A1 Feb. 22, 2024

(30) Foreign Application Priority Data

Aug. 19, 2022 (EP) .................................... 22191250

(51) Int. Cl.

*G01N 21/64* (2006.01)
*B01L 3/00* (2006.01)
*G01N 35/00* (2006.01)

(52) U.S. Cl.

CPC ...... *G01N 21/6428* (2013.01); *B01L 3/50851* (2013.01); *G01N 35/0099* (2013.01); *B01L 2200/025* (2013.01); *B01L 2300/0609* (2013.01); *B01L 2300/0832* (2013.01); *G01N 2021/6439* (2013.01); *G01N 2035/00356* (2013.01)

(58) Field of Classification Search

CPC ....... B01L 2200/025; B01L 2300/0609; B01L 2300/0636; B01L 2300/0832; B01L 3/50851; B01L 7/52; B01L 9/06; G01N 1/30; G01N 2021/6439; G01N 2035/00356; G01N 21/6428; G01N 21/6452; G01N 21/6458; G01N 35/0099

See application file for complete search history.

(56) References Cited

U.S. PATENT DOCUMENTS

| | | | | |
|---|---|---|---|---|
| 6,572,828 | B1 | 6/2003 | Potyrailo et al. | |
| 10,323,274 | B2 | 6/2019 | Freudenthal et al. | |
| 2006/0153736 | A1 | 7/2006 | Kalra et al. | |
| 2012/0276541 | A1 | 11/2012 | Lian | |
| 2013/0136670 | A1* | 5/2013 | Wiltsie | C12Q 1/686 422/500 |
| 2018/0080876 | A1* | 3/2018 | Rockel | G01N 21/6456 |
| 2018/0298427 | A1* | 10/2018 | Buse | B01L 3/50825 |
| 2018/0361379 | A1* | 12/2018 | Biro | B01L 7/52 |

(Continued)

FOREIGN PATENT DOCUMENTS

WO WO 2022/077074 A1 4/2022

*Primary Examiner* — Jennifer Wecker
*Assistant Examiner* — Jonathan Bortoli
(74) *Attorney, Agent, or Firm* — LEYDIG, VOIT & MAYER, LTD.

(57) ABSTRACT

An imaging device for imaging samples received in a sample carrier includes an imaging position configured to receive the sample carrier. The sample carrier includes at least one sample receiving compartment configured to receive a sample. The imaging device further includes an optical detection system configured to image the sample when the sample carrier is received in the imaging position, an annealing position configured to receive the sample carrier, and a temperature control unit configured to control a temperature of the sample receiving compartment when the sample carrier is received in the annealing position.

17 Claims, 4 Drawing Sheets

(56) References Cited

U.S. PATENT DOCUMENTS

| | | | | |
|---|---|---|---|---|
| 2020/0391210 | A1 | 12/2020 | Handique | |
| 2021/0033523 | A1 * | 2/2021 | Wohlstadter | G01N 21/69 |
| 2022/0001380 | A1 | 1/2022 | Christ | |

* cited by examiner

IMAGING DEVICE

CROSS REFERENCE TO RELATED APPLICATIONS

This application claims benefit to European Patent Application No. EP 22191250.4, filed on Aug. 19, 2022, which is hereby incorporated by reference herein.

FIELD

Embodiments of the present invention relate to an imaging device.

BACKGROUND

In the field of spatial omics, samples are subjected to multiple cycles of manipulation and treatment with various reagents, in order to study various biological processes. The reagents are for example probes, antibodies or chemicals. In particular, when the reagents comprise fluorophores, the reagents are also called markers. In order to observe the reaction of the samples to the treatment, the samples are usually imaged by a microscope either during or after they have been treated with the reagents.

A single experiment may comprise multiple cycles of staining, washing, and imaging. Typically, a cycle comprises the following steps: Staining the sample with one or more reagents, annealing the reagent, washing the sample with a washing buffer, imaging the sample, bleaching markers from the first staining and/or unmasking epitopes, washing the sample with a washing buffer to remove used reagents. Some cycles may comprise multiple steps of staining, annealing, and washing. For example, indirect staining with antibodies comprises a first part of adding antibodies or probes that bind to a certain target, and a second part of adding second antibodies, probes or staining agents that bind to the first antibodies or probes. Each of the two parts comprises steps of staining, annealing, and washing. After the cycle has been completed, the sample may be stained again with different reagents.

A typical experimental setup comprises a dedicated microscope for imaging the sample. The staining and washing steps are typically performed outside the microscope, either manually on a work bench or with an automated system such as an immunohistochemistry (IHC) stainer. Manually handling the samples is time consuming and considerably reduces the throughput of an experiment. Integrated solutions exist combining both a microscope and a stainer that reduce the time needed to handle the samples. However, no solution exists that integrates all steps of a staining, imaging, and washing cycle allowing for a fast and efficient handling of samples.

SUMMARY

Embodiments of the present invention provide an imaging device for imaging samples received in a sample carrier includes an imaging position configured to receive the sample carrier. The sample carrier includes at least one sample receiving compartment configured to receive a sample. The imaging device further includes an optical detection system configured to image the sample when the sample carrier is received in the imaging position, an annealing position configured to receive the sample carrier, and a temperature control unit configured to control a temperature of the sample receiving compartment when the sample carrier is received in the annealing position.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
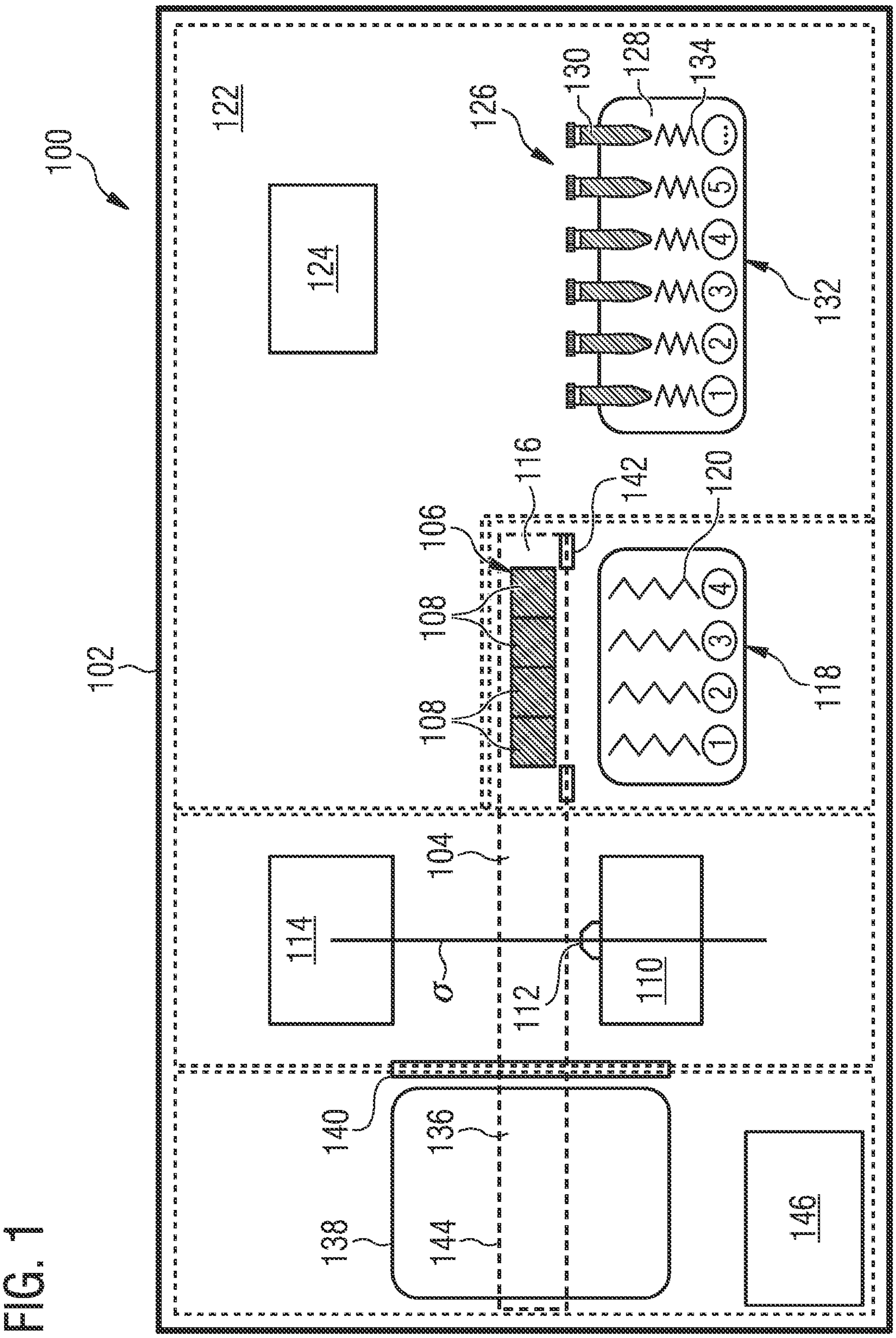
FIG. 1 is a schematic view of an imaging device according to an embodiment.

Embodiments of the present invention provide an imaging device that that allows for a fast and efficient handling of samples.

According to some embodiments, an imaging device for imaging samples received in a sample carrier comprises an imaging position configured to receive the sample carrier. The sample carrier comprises at least one sample receiving compartment being configured to receive a sample. The imaging system further comprises an optical detection system configured to image the sample when the sample carrier is received in the imaging position, an annealing position configured to receive the sample carrier, and a temperature control unit configured to control the temperature of the sample receiving compartment when the sample carrier is received in the annealing position.

The sample receiving compartment may be any part or element of the sample carrier configured to receive at least one of the samples. For example, when the sample carrier is formed as a microwell plate, the sample receiving compartment may be one or all of the wells. As another example, when the sample carrier is formed as a microscope slide, the sample receiving compartment may be formed between the actual microscope slide and a cover plate. Preferably, the imaging position and the annealing position are different from each other. However, the imaging position and the annealing position may also coincide.

The temperature control unit controls the temperature of the sample receiving compartment, thereby allowing a fine control over the temperature of the sample received therein. In particular antibodies and a lot of chemical probes, for example probes used in fluorescence in situ hybridization (FISH) experiments, are highly dependent on the temperatures during the annealing process. Temperature is an important factor that can determine the specificity and the efficiency of a staining process. Temperature is also a determining factor in the efficiency of the washing step as well as the overall speed of a staining, and washing cycle. Thus, by allowing a fine control of the temperature, for example with an accuracy of 1° or 0.1° Celsius, the proposed imaging device allows a very precise control of the annealing step, thereby increasing the overall efficiency of the staining step of the staining, imaging, and washing cycle. The temperature control unit is also part of the imaging device itself, thereby allowing to perform the annealing step in situ, i.e. inside the imaging device. This is considerably faster than removing the samples from the imaging device in order to perform the annealing step with an external device. The imaging device forms an integrated system for performing the annealing step and the imaging of the sample. Thus, the proposed imaging device facilitates fast and efficient handling of samples.

In a preferred embodiment, the sample carrier comprises at least two sample receiving compartments. Each sample receiving compartment is configured to receive one of the samples. In particular, the at least two sample receiving compartments are structurally separated. For example, each of the sample receiving compartments may be formed by a well of a microwell plate. In another example, each of the sample receiving compartments may be configured to receive a microscope slide upon which a sample is prepared. The temperature control unit may be configured to control the temperature of each of the sample receiving compartments individually. This, allows a fine control over the temperature of each of the samples. Further, different reagents with different temperature requirements may be used at the same time. Thereby, the versatility of the imaging device is further increased.

In another preferred embodiment, the temperature control unit is configured to adjust the temperature of the at least one sample receiving compartment according to a predetermined temperature curve. When the sample carrier comprises more than one sample receiving compartment, the temperature control unit may be configured to control the temperature of each of the sample receiving compartments individually according to a predetermined temperature curve. Each of the predetermined temperature curves is unique to its associated sample receiving compartment. For example, the temperature of the sample receiving compartment may be controlled such that the temperature slowly rises over a predetermined time period, is held at a certain temperature for another period of time, and is lowered again over yet another period of time. Other temperature curve are possible. Controlling the temperature of the sample receiving compartments in such a way during the annealing step allows for the implementation of staining/detaining protocols that are tailored towards certain reagents' requirements. This further increases control of the annealing step, thereby increasing the specificity and the efficiency of a staining process.

In another preferred embodiment, the temperature control unit comprises at least one heating element arranged at the annealing position, and configured to heat the at least one sample receiving compartment when the sample carrier is received in the annealing position. When the sample carrier comprises more than one sample receiving compartment, the temperature control unit may comprise at least one heating element for each of the sample receiving compartments, in order to control the temperature of each of the sample receiving compartments individually. Heating elements, such as electrically controlled heating elements, are easy to use and allow a very precisely controlled heating.

In another preferred embodiment, the imaging device comprises a pipetting system having a pipetting unit configured to pipet the at least one sample receiving compartment. When the sample carrier comprises more than one sample receiving compartment, the pipetting unit may be configured to pipet each of the sample receiving compartments individually. In this embodiment, the imaging device is configured to introduce the reagents into the samples in situ, i.e. inside the imaging system itself. Thereby, the imaging device forms a wholly integrated system for performing the staining and washing cycles as well as the imaging of the sample. This further improves ease of use and makes sample handling even more efficient and faster.

In another preferred embodiment, the pipetting system comprises a storage compartment configured to store pipetting liquids. The storage compartment may be lighttight. Many reagents such as markers used in FISH protocols are highly sensitive to light and may decompose when exposed to light. By storing the reagents in a lighttight environment less of the reagents spoil before they are used. This not only decreases waste but also increases the efficiency of the staining and washing cycles. Further, in this embodiment, the reagents are stored inside the imaging device itself making manual handling of the reagents during the staining and washing cycles unnecessary. This further reduces the need for human interaction and increases the degree of automation of the imaging device, thereby increasing the throughput and the walk away time.

In another preferred embodiment, the pipetting system comprises a second temperature control unit configured to control the temperature of the storage compartment. Many reagents are not only sensitive to light but also have certain temperature requirements, and may decompose when stored at the wrong temperature. By storing the reagents in a temperature controlled environment, waste is further decreased and the efficiency of the staining and washing cycles is further increased. A storing temperature may have a value for example out of a range between 4° C. to 37° C.

In another preferred embodiment, the storage compartment comprises at least one storage position. The storage position is configured to receive a removable storage container for a pipetting liquid. The second temperature control unit may be configured to control the temperature of the at least one storage container when the storage container is received in the storage position. When the storage compartment comprises more than one storage position, the second temperature control unit may be configured to control the temperature of each of the storage containers individually when the respective storage container is received in one of the storage positions. In this embodiment the temperature of different reagents may be controlled individually. This allows different reagents with different temperature requirements to be stored and used at the same time. Thereby, the versatility of the imaging device is further increased.

In another preferred embodiment, the imaging device comprises a pipetting position being different from at least one of the imaging position and the annealing position configured to receive the sample carrier. The pipetting unit is configured to pipet the at least one sample receiving compartments individually when the sample carrier is received in the pipetting position. When the sample carrier comprises more than one sample receiving compartment, the pipetting unit may be configured to pipet each of the sample receiving compartments individually when the sample carrier is received in the pipetting position. At least two pipetting elements may be used for pipetting the samples being present in the more than one sample receiving compartment individually. In this embodiment, the imaging device comprises a dedicated pipetting position in which the sample carrier may be pipetted by the pipetting unit. This allows a sample carrier to be pipetted while another sample carrier is imaged or annealed, thereby increasing the throughput of the imaging device. It further reduces the risk of pipetting liquid entering the optical detection system.

In another preferred embodiment, the pipetting unit is a pipetting robot. The pipetting robot may be tooth rack pipettor or x-y-z pipetting rack using disposable syringes and/or tips. The pipetting robot may also use steel needles. Pipetting robots are very precise pipetting devices, allowing a very fine control over the amount of liquid reagent introduced into the sample. Pipetting robots are further capable of pipetting a large number of sample receiving compartments in a short amount of time. This further speeds up the staining and washing cycles.

In another preferred embodiment, the imaging position comprises a sample stage configured to move the sample carrier relative to an optical axis of the optical detection system. The sample stage may be a X-Y-table. The sample stage can be used to position the sample very precisely in the field of view of the optical detection system. In particular, when the sample carrier comprises more than one sample receiving compartment, the sample stage may be used to select one of the sample receiving compartments for microscopic observation by positioning the respective sample receiving compartment in the field of view of the optical detection system.

In another preferred embodiment, the imaging device comprises a sample transfer unit configured to transfer the sample carrier between at least two of the imaging position, the annealing position, and a or the pipetting position. In particular, the sample transfer unit comprises the sample stage. The sample transfer unit is used to automatically transfer the sample carrier between the imaging position, the annealing position, and the pipetting position. This further increased the degree of automation of the imaging device since no human interaction is needed, lar this may accomplish multiple staining cycles. Thereby the throughput and the walk away time are further increased.

In another preferred embodiment, the imaging device comprises a housing. The housing encloses at least the imaging position, the annealing position, and a or the pipetting position. Preferably, the housing comprises at least one external door providing access to at least one of the imaging position, the annealing position, and a or the pipetting position from the outside. In this embodiment, the housing may be a single monolithic element enclosing the other elements of the imaging device. In such an embodiment, the imaging device is a wholly integrated system that takes little time and effort to set up. Alternatively, the imaging device may be a modular device where at least two of the imaging position, the annealing position, and the pipetting position are provided in different modules of the housing that can be arranged to form the imaging device. Such a modular device has the advantage of being very flexible and versatile, because for example servicing of the imaging device can easily be done by replacing only one defect module.

In another preferred embodiment, the housing is formed such that at least one of the imaging position, the annealing position and the pipetting position is lighttight. By handling the samples stained with the reagents in a lighttight environment less of the reagents spoil before they are used and/or can bind to the sample. This not only decrease waste but also increase the efficiency of the staining and washing cycles.

The annealing position may be configured as a loading position. In another preferred embodiment, the imaging device comprises a loading position different from the imaging position and the annealing position configured to receive the sample carrier. The housing comprises an external door providing access to the loading position from the outside. The sample transfer unit may be configured to transfer the sample carrier between the loading position and at least one of the imaging position, the annealing position, and the pipetting position. In this embodiment, a user can load the sample carrier into the imaging device without interacting with either the imaging position or the annealing position. This allows, for example, loading the sample carrier during an ongoing experiment, thereby improving the usability of the imaging device. Providing a dedicated loading position also shields the imaging position or the annealing position from the outside, preventing sensitive reagents or samples from spoiling. The loading position may be configured to receive more than one sample carrier, such that the user can load multiple sample carriers into the imaging device at the same time. Thereby, multiple sample carriers may be processed by the imaging device, either sequentially or concurrently. This further increases the walk away time as well as the throughput of the imaging device.

In another preferred embodiment, the imaging device comprises at least one lighttight door arranged between the loading position and the imaging position and/or the annealing position. The lighttight door shields a sample carrier arranged in the imaging position and/or the annealing position from light, thereby preventing reagents sensitive to light from spoiling when the external door is opened.

In another preferred embodiment, the optical detection system comprises a microscope objective directed at the imaging position. A microscope objective provides magnification, thereby allowing small details to be resolved that would be invisible to the unaided eye. This allows, for example, smaller structures of a sample to be imaged by the imaging device.

In another preferred embodiment, the imaging device comprises an illumination system configured to illuminate the sample when the sample carrier is received in the imaging position. The illumination system may be configured for incident light illumination or transmitted light illumination. The illumination system may also be configured to generate excitation light for exciting fluorophores. The illumination system may comprise one or more light sources, for example in the form of at least one LED and/or laser.

In another preferred embodiment, the optical detection system and the illumination system are configured for fluorescence imaging. This allows the imaging system to image markers located in the sample that comprise fluorophores, thereby making the imaging device compatible with a large number of biochemical protocols that rely on fluorescent markers, for example FISH. This greatly increases the versatility of the imaging device, for example for the analysis of the sample in the field of spatial omics.

FIG. 1 is a schematic view of an imaging device 100 according to an embodiment.

The imaging device 100 is exemplary formed as a box type microscope comprising a housing 102 that encloses all other elements of the imaging device 100. The housing 102 is configured to be lighttight, i.e. it prevents light from entering the interior of the imaging device 100.

The imaging device 100 has an imaging position 104 configured to receive a sample carrier 106 comprising sample receiving compartments 108. An optical detection system 110 is configured to image samples received in the sample receiving compartments 108 of the sample carrier 106 when the sample carrier 106 is received in the imaging position 104. The optical detection system 110 of the imaging device 100 is exemplary arranged below the imaging position 104 (and below the sample carrier 106), and comprises a microscope objective 112 directed at the imaging position 104. An illumination system 114 of the imaging device 100 is exemplary arranged atop the imaging position 104 (and above the sample carrier 106), and configured to illuminate the samples received in the sample receiving compartments 108 of the sample carrier 106 when the sample carrier 106 is received in the imaging position 104. In the present embodiment, the illumination system 114 and the optical detection system 110 are configured for fluorescence imaging. The illumination system 114 is configured to generate excitation light for exciting fluorophores located in the samples, and the optical detection system 110 is configured to generate images from fluorescence light emitted by the excited fluorophores. This allows the imaging of biochemical markers comprises fluorophores that are located inside the samples.

An annealing position 116 of the imaging device 100 is located to the right of the imaging position 104 in FIG. 1, and configured to receive the sample carrier 106. A first temperature control unit 118 of the imaging device 100 is exemplary arranged below the annealing position 116 (and below the sample carrier 106). The first temperature control unit 118 comprises four heating elements 120. Each of the heating elements 120 is arranged below one of the sample receiving compartments 108 when the sample carrier 106 is arranged in the annealing position 116. The heating elements 120 allow the first temperature control unit 118 to control the temperature of each of the sample receiving compartments 108 individually. The temperature control unit 118 is further configured to control the temperature of each of the sample receiving compartments 108 according to an individual temperature curve.

A pipetting system 122 of the imaging device 100 is located above and to the right of annealing position 116 in FIG. 1. The pipetting system 122 comprises a pipetting unit 124 that is exemplary formed as a pipetting robot, and configured to pipet each of the sample receiving compartments 108 individually when the sample carrier 106 is received in the annealing position 116. Accordingly, the annealing position 116 is also a pipetting position in the embodiment shown in FIG. 1. However, a dedicated pipetting position may also be provided. The pipetting system 122 comprises a storage compartment 126 for storing pipetting liquids such as reagents, markers, and washing buffers. The storage compartment 126 exemplary comprises six storage positions 128. Each storage position 128 is configured to receive a removable storage container 130 for a pipetting liquid. A second temperature control unit 132 is arranged in the storage compartment 126 and comprises six heating elements 134. Each of the heating elements 134 is arranged at one of the storage positions 128 and allows the second temperature control unit 132 to control the temperature of each of the removable storage containers 130 individually. The pipetting unit 124 may select any one of the pipetting liquids stored in the storage compartment 126 for pipetting the sample receiving compartments 108.

The imaging device 100 has a loading position 136 arranged to the left of the imaging position 104 in FIG. 1, and configured to receive the sample carrier 106. An external door 138 of the imaging device 100 is arranged at the loading position 136 that allows access to the loading position 136 from the outside. Via the external door 138 a user can load the sample carrier 106 into the imaging device 100. A lighttight door 140 is arranged between the loading position 136 and the imaging position 104 in order to prevent light from entering the imaging position 104 when the external door 138 is opened. Thereby, the loading position 136 forms a lock allowing the user to load the sample carrier 106 into the imaging device 100 without disturbing an ongoing experiment.

The imaging device 100 comprises a sample stage 142. The sample stage 142 may be configured to receive the sample carrier 106 in an opening that allows the samples received in the sample carrier 106 to be observed from below. The sample stage 142 is further configured to move the sample carrier 106 in a plane that is perpendicular to the optical axis O of the microscope objective 112. Additionally, the sample stage 142 may be configured to move the sample carrier 106 in a direction parallel to the optical axis O of the microscope objective 112. The range of movement 144 of the sample stage 142 is such that the sample stage 142 can transfer the sample carrier 106 between the loading position 136, the imaging position 104, and the annealing position 116. Therefore, in this embodiment, the sample stage 142 forms a sample transfer unit. The range of movement 144 of the sample stage 142 is indicated in FIG. 1 by a dashed rectangle.

The imaging device 100 further comprises a control unit 146 connected to the optical detection system 110, the illumination system 114, the first temperature control unit 118, the pipetting unit 124, the second temperature control unit 132, the sample stage 142 and the lighttight door 140 between the loading position 136 and the imaging position 104. For the sake of clarity, the connection are not shown in FIG. 1. The control unit 146 is configured to receive the temperature curves for controlling the first temperature control unit 118 from an external source, for example from a user input device or a storage element. The control unit 146 is further configured to perform a method for imaging the samples received in the sample carrier 106 that is detailed below with reference to FIG. 4.

Figure 2:
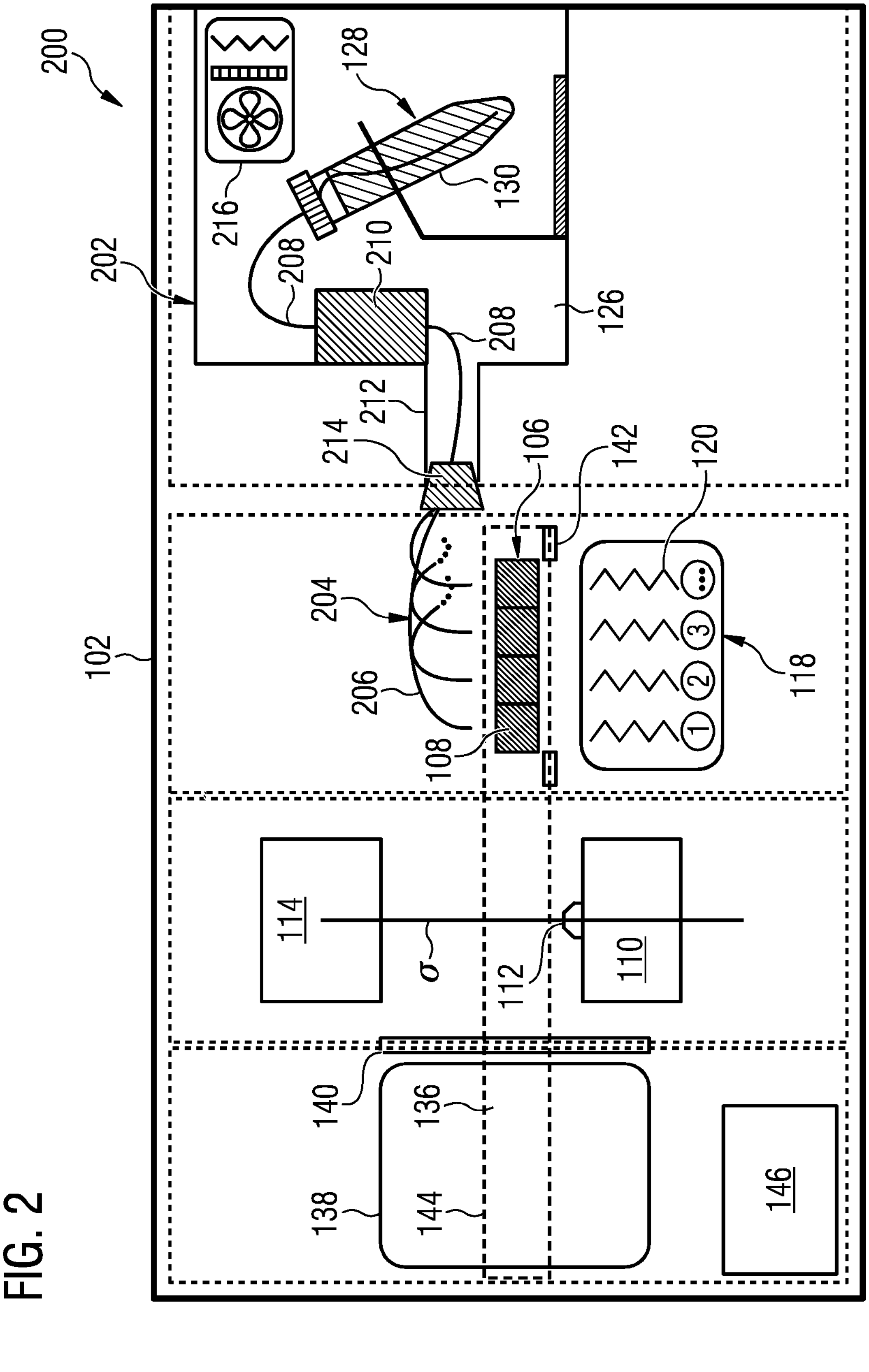
FIG. 2 is a schematic view of an imaging device according to another embodiment.

FIG. 2 is a schematic view of an imaging device 200 according to another embodiment.

The imaging device 200 shown in FIG. 2 is distinguished from the imaging device 100 shown in FIG. 1 in having a different pipetting system 202. The storage compartment 126 of the pipetting system 202 according to FIG. 2 comprises only a small number of storage positions 128. However, each storage position 128 is configured to receive a removable storage container 130 having a large capacity.

The pipetting unit 204 of the pipetting system 202 according to FIG. 2 comprises injection tips 206 that are arranged above the sample carrier 106 when the sample carrier 106 is received in the annealing position 116. Each injection tip 206 is arranged above one of the sample receiving compartments 108. Fluid lines 208 connect the injection tips 206 with the storage containers 130, and a pumping unit 210 is configured to pump the pipetting liquid form the storage containers 130 to the injection tips 206. A connection 212 between the storage compartment 126 and the annealing position 116 is sealed with a stopper 214. The stopper 214 has at least one opening through which the Fluid lines 208 are guided.

The second temperature control unit 216 according to FIG. 2 is configured to control the temperature of the storage compartment 126 itself instead of the individual storage positions 128. The storage compartment 126 is thermally insulted, preventing heat or chill from escaping the storage compartment 126.

Figure 3:
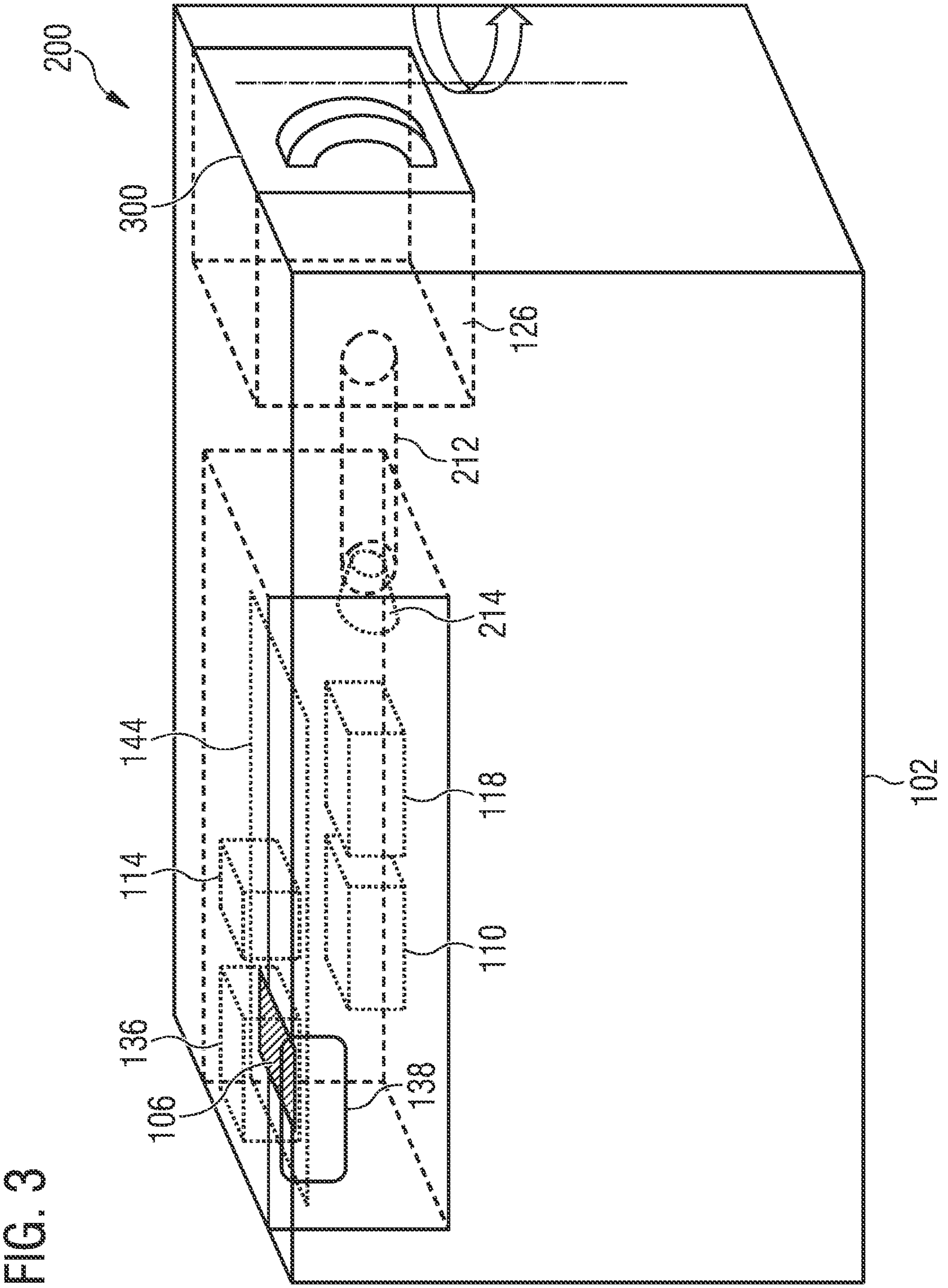
FIG. 3 is a schematic perspective view of the imaging device according to FIG. 2.

FIG. 3 is a schematic perspective view of the imaging device 200 according to FIG. 2.

Elements located inside the housing 102 are shown with dashed or dotted lines. Some elements have been omitted from FIG. 3 for the sake of clarity.

As can be seen in FIG. 3, the imaging device 200 comprises a second external door 300 arranged at the right side of the housing 102 in FIG. 3. The second external door 300 provides access to the storage compartment 126 of the pipetting system 202. The user may load storage containers 130 into the storage compartment 126 via the second external door 300.

Figure 4:
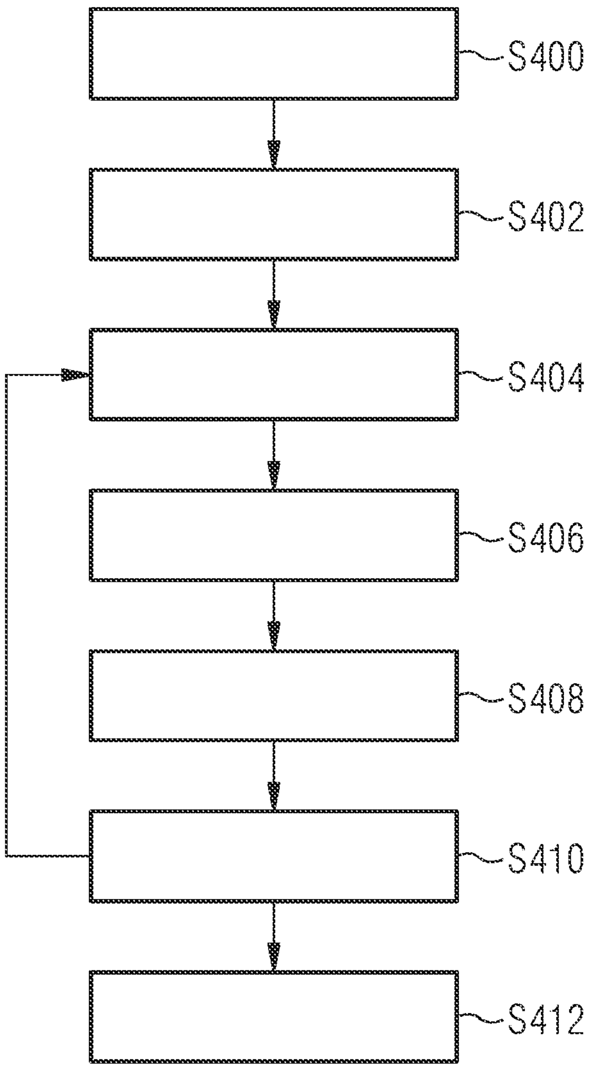
FIG. 4 is the flowchart of a method for imaging samples using an imaging device to an embodiment.

FIG. 4 is the flowchart of a method for imaging samples using an imaging device 200 to an embodiment.

The method may be performed with the imaging device 100 according to FIG. 1 or with the imaging device 200 according to FIGS. 2 and 3. The method is only exemplary described with reference to the imaging device 200 according to FIGS. 2 and 3.

The process is started in step S400. In step S402 the sample carrier 106 is loaded into the imaging device 200 through the first external door 138. The sample carrier 106 is placed on the sample stage 142 in the loading position 136. In step S404 the sample carrier 106 is moved to the annealing position 116 by the sample stage 142, and the samples arranged in the sample carrier 106 are stained with one or more reagents stored in the storage compartment 126 by introducing the reagents into the sample receiving compartments 108 via the injection tips 206. Reagents may include but are not limited to probes, antibodies or chemicals. The reagents may comprise fluorophores. In this case, the reagent is also referred to as a marker.

In step S406 the reagents are annealed by adjusting the temperature of the sample receiving compartments 108 with the first temperature control unit 118 to the needs of each reagent. During the annealing step the reagents either bind to certain structures in the samples or react in other ways with the sample. How well the reagents bind to the certain structures, i.e. the specificity of the reagents, depends on how well the temperature needs of the reagents are met. Since the first temperature control unit 118 can adjust the temperature of the sample receiving compartments 108 individually and according to an individual temperature curve, many different reagents having different temperature requirements during the annealing step may be used at the same time.

In step S408 the sample is washed with a washing buffer also stored in the storage compartment 126 in order to remove unbound antibodies or reagent residues that prevent proper imaging. The washing buffer is introduced into the sample receiving compartments 108 via the injection tips 206. In step S410 the sample carrier 106 is moved from the annealing position 116 to the imaging position 104 by the sample stage 142, and the samples are imaged. The imaging step may comprise exciting fluorophores located in the sample with excitation light.

The process is ended in step S412.

Steps S404 to S410 comprise a single staining, washing, and imaging cycle and may be repeated with different reagents in order to image additional features of the same samples. A single marker may be identical in all cycles as a reference for aligning other markers in the imaging step.

Identical or similarly acting elements are designated with the same reference signs in all Figures. As used herein the term “and/or” includes any and all combinations of one or more of the associated listed items and may be abbreviated as “/”. Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

LIST OF REFERENCE SIGNS

100 Imaging device
102 Housing
104 Imaging position
106 Sample carrier
108 Sample receiving compartment
110 Optical detection system
112 Microscope objective
114 Illumination system
116 Annealing position
118 Temperature control unit
120 Heating element
122 Pipetting system
124 Pipetting unit
126 Storage compartment
128 Storage positions
130 Storage container
132 Temperature control unit
134 Heating element
136 Loading position
138 External door
140 Lighttight door
142 Sample stage
144 Range of movement
146 Control unit
200 Imaging device
202 Pipetting system
204 Pipetting unit
206 Injection tips
208 Fluid lines
210 Pumping unit
212 Connection

214 Stopper
300 External door

The invention claimed is:

1. A device for imaging two or more samples in two or more sample receiving compartments of a movable sample carrier, the device comprising:

a first site for receiving the movable sample carrier for imaging the two or more samples in the two or more sample receiving compartments;

a second site for receiving the movable sample carrier for annealing, with one or more reagents, the two or more samples in the two or more sample receiving compartments wherein the first site and the second site do not overlap;

an imaging system comprising a microscope objective having an optical path directed at the first site for imaging the two or more samples with the movable sample carrier in the first site;

a first temperature control unit comprising two or more heating elements and configured to thermally control individually each of the two or more sample receiving compartments at a corresponding temperature using a corresponding heating element of the two or more heating elements with the movable sample carrier in the second site; and a sample carrier transport unit configured to transport the movable sample carrier to and from the first site and the second site.

2. The device according to claim 1, wherein the first temperature control unit is configured to thermally control individually each of the two or more sample receiving compartments by adjusting the corresponding temperature of each of the two or more sample receiving compartments according to a predetermined temperature curve.

3. The device according to claim 1, further comprising a pipetting system having a pipetting robot configured to pipet the two or more samples into the two or more sample receiving compartments.

4. The device according to claim 3, wherein the pipetting system comprises a storage compartment configured to store a liquid.

5. The device according to claim 4, wherein the pipetting system further comprises a second temperature control unit configured to thermally control the storage compartment at a set temperature.

6. The device according to claim 4, wherein the storage compartment includes a storage site for receiving a removable storage container for storing the liquid, and wherein the pipetting system further comprises a second temperature control unit configured to thermally control the storage container at a set temperature with the removable storage container in the storage site.

7. The device according to claim 3, further comprising a third site for receiving the movable sample carrier for pipetting the two or more samples into the two or more sample receiving compartments using the pipetting robot with the movable sample carrier in the third site, wherein the third site does not overlap the first site or the second site or both.

8. The device according to claim 1, further comprising a sample stage configured to move the movable sample carrier within the first site relative to an optical axis of the imaging system.

9. The device according to claim 7, wherein the sample carrier transport unit is further configured to transport the movable sample carrier to and from the third site and the first site and to and from the third site and second site.

10. The device according to claim 9, wherein the sample carrier transport unit comprises a sample stage.

11. The device according to claim 7, further comprising a housing enclosing one of the group consisting of the first site, the second site and the third site, or a combination thereof.

12. The device according to claim 11, wherein the housing comprises one or more external lighttight doors on the housing openable for accessing at least one of the first site, the second site and the third site from outside the housing.

13. The device according to claim 11, wherein the housing is lighttight.

14. The device according to claim 11, further comprising a a fourth site for loading the movable sample carrier and the housing comprises one or more external lighttight doors on the housing openable for accessing at least one of the first site, the second site, the third site and fourth site from outside the housing.

15. The device according to claim 14, further comprising one or more lighttight doors arranged within the housing and between the at least two of the first site, the second site and the third site.

16. The device according to claim 1, further comprising an illumination system configured to illuminate the two or more samples with the movable sample carrier in the first site.

17. The device according to claim 16, wherein the imaging system and the illumination system are configured to image fluorescence from the two or more samples.

* * * * *